United States Patent
De Goes et al.

(10) Patent No.: US 12,450,835 B2
(45) Date of Patent: Oct. 21, 2025

(54) CHARACTER ARTICULATION THROUGH PROFILE CURVES

(71) Applicant: Pixar, Emeryville, CA (US)

(72) Inventors: Fernando Ferrari De Goes, Kensington, CA (US); Kurt W. Fleischer, Piedmont, CA (US); William F. Sheffler, Lafayette, CA (US)

(73) Assignee: Pixar, Emeryville, CA (US)

( * ) Notice: Subject to any disclaimer, the term of this patent is extended or adjusted under 35 U.S.C. 154(b) by 202 days.

(21) Appl. No.: 18/067,380

(22) Filed: Dec. 16, 2022

(65) Prior Publication Data
US 2024/0203056 A1 Jun. 20, 2024

(51) Int. Cl.
*G06T 17/20* (2006.01)
*G06T 13/40* (2011.01)
*G06T 19/20* (2011.01)

(52) U.S. Cl.
CPC ............ *G06T 17/205* (2013.01); *G06T 13/40* (2013.01); *G06T 19/20* (2013.01); *G06T 2219/2016* (2013.01)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 2210/41; G06T 15/005; G06T 1/20; G06T 19/006; G06T 17/205; G06T 19/20; G06T 2219/2016; G06F 16/51; G06F 21/602; H04N 23/64; H04N 23/90
USPC ........................................................ 345/419
See application file for complete search history.

(56) References Cited

U.S. PATENT DOCUMENTS

| | | | |
|---|---|---|---|
| 2006/0013505 A1* | 1/2006 | Yau ......................... | G06V 20/64 382/285 |
| 2006/0290695 A1* | 12/2006 | Salomie .................. | G06T 17/20 345/423 |
| 2007/0115289 A1* | 5/2007 | Goldfarb ................. | G06T 13/40 345/473 |
| 2021/0019931 A1* | 1/2021 | De Goes ................. | G06T 19/20 |

OTHER PUBLICATIONS

F. de Goes, A. Butts, and M. Desbrun. 2020. Discrete Differential Operators on Polygonal Meshes. ACM Transactions on Graphics 39, 4, Article 110 (2020), 14 pages.
M. Berger. 2017. Chapter 1—Cut Cells: Meshes and Solvers. In Handbook of Numerical Methods for Hyperbolic Problems, R. Abgrall and C.-W. Shu (Eds.). Handbook of Numerical Analysis, vol. 18. Elsevier, 1-22. [Abstract Only].
M. Tao, C. Batty, E. Fiume, and D. I. W. Levin. 2019. Mandoline: Robust Cut-Cell Generation for Arbitrary Triangle Meshes, ACM Transactions on Graphics 38, 6, Article 179 (2019), 17 pages.

* cited by examiner

*Primary Examiner* — Gordon G Liu
(74) *Attorney, Agent, or Firm* — Patterson + Sheridan, LLP; Gero G. McClellan

(57) ABSTRACT

Techniques for computer animation are disclosed. These techniques include receiving a plurality of curvenet segments relating to a computer animation model comprising a surface mesh, and generating a cut-mesh that cuts the surface mesh using the curvenet segments. The techniques further include computing a deformation of the plurality of curvenet segments to the surface mesh using the cut-mesh, and displaying the computer animation model in a pose based on the deformation.

20 Claims, 6 Drawing Sheets

CHARACTER ARTICULATION THROUGH PROFILE CURVES

BACKGROUND

Computer animation typically relies heavily on rigging setups that articulate character surfaces through a broad range of poses. Although many deformation strategies have been proposed over the years, constructing character rigs is still a cumbersome process that generally involves repetitive authoring of point weights and corrective sculpts with limited and indirect shaping controls. For example, constructing character rigs using existing solutions typically involves authoring numerous point weights and corrective sculpts, with limited and indirect shaping controls.

SUMMARY

Embodiments include a method. The method includes receiving a plurality of curvenet segments relating to a computer animation model comprising a surface mesh. The method further includes generating a cut-mesh that cuts the surface mesh using the curvenet segments. The method further includes computing a deformation of the plurality of curvenet segments to the surface mesh using the cut-mesh. The method further includes displaying the computer animation model in a pose based on the deformation.

Embodiments further include a non-transitory computer-readable medium containing computer program code that, when executed by operation of one or more computer processors, performs operations. The operations include receiving a plurality of curvenet segments relating to a computer animation model comprising a surface mesh. The operations further include generating a cut-mesh that cuts the surface mesh using the curvenet segments. The operations further include computing a deformation of the plurality of curvenet segments to the surface mesh using the cut-mesh. The operations further include displaying the computer animation model in a pose based on the deformation.

Embodiments further include a system, including a processor and a memory having instructions stored thereon which, when executed on the processor, performs operations. The operations include receiving a plurality of curvenet segments relating to a computer animation model comprising a surface mesh. The operations further include generating a cut-mesh that cuts the surface mesh using the curvenet segments. The operations further include computing a deformation of the plurality of curvenet segments to the surface mesh using the cut-mesh. The operations further include displaying the computer animation model in a pose based on the deformation.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
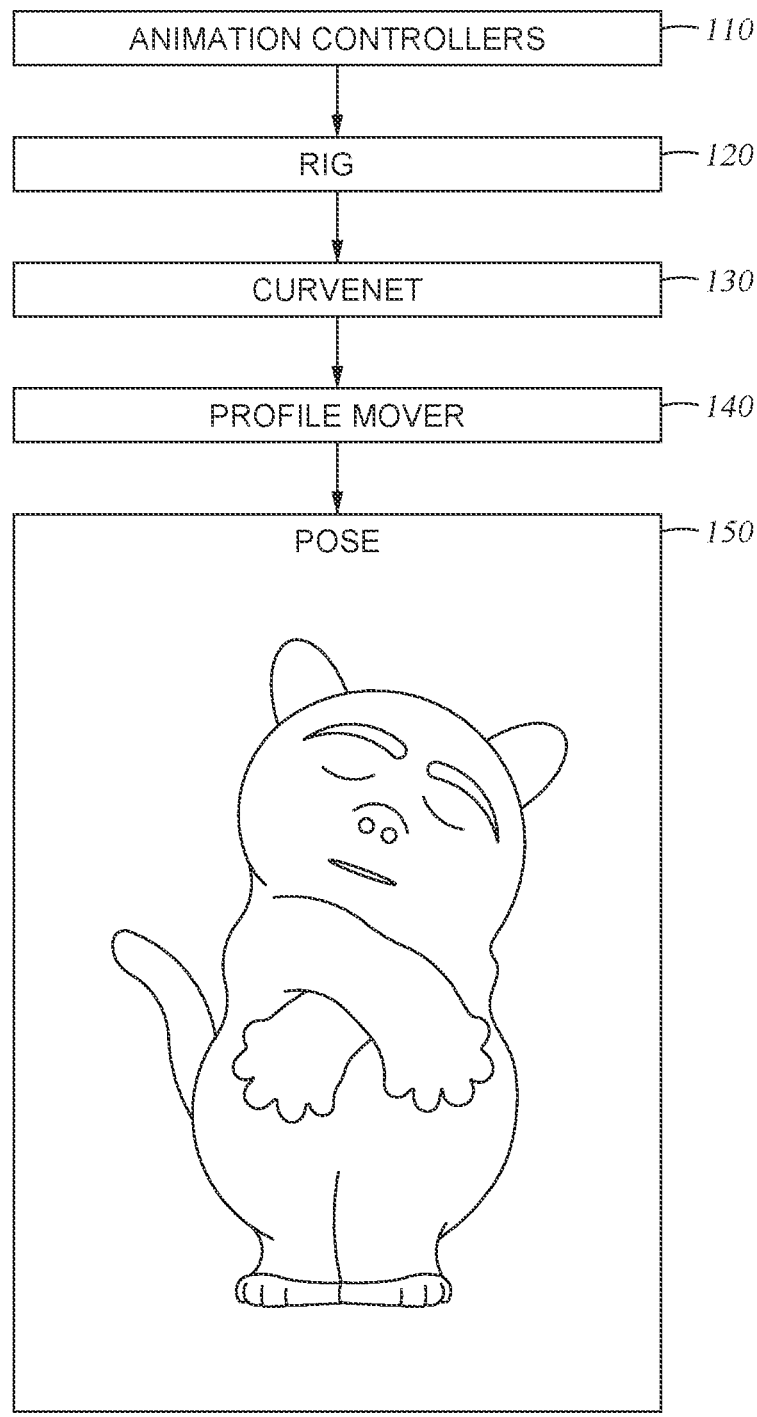
FIG. 1 is a block diagram illustrating character articulation through profile curves, according to one embodiment.

As discussed above, rigging plays a central role in character animation by defining the articulation setup that drives the deformation of digital characters. Over the last decades, character rigs have been built predominantly based on skinning schemes combined with corrective blend shapes. Despite the broad adoption in industry, these techniques are laborious to author with artists often hand-crafting weights and sculpts one pose at a time. Moreover, shaping character deformations involves repetitive trial and error in order to preserve surface details while neutralizing skinning artifacts. Another major challenge is the frequent need to repair the rig configuration after modeling updates, especially in areas of increased mesh resolution to avoid faceting artifacts. Consequently, designing high-quality character rigs remains a costly and specialized task (e.g., in feature animations).

One or more techniques disclosed herein compute character articulation by first rigging profile curves created by a user, and propagating the curve deformation over the surface mesh afterwards. This is done using curvenets as a new rigging representation formed by the profile curves, which separates articulation controllers from the deforming surface. For example, curvenets can be constructed using cubic Bézier splines traced near the character surface (e.g., by an artist) and arranged into connected components with no restrictions on their topological structure.

Equipped with curvenets, one or more techniques disclosed herein assemble the character rig by parts (e.g., hands, body, face, or any other suitable part) and independent of the mesh connectivity, thus facilitating concurrent work between modelers and riggers. The curvenet layout also allows for computation of frames at the net intersections accompanied by a scaling amount per axis, which can then be interpolated along the profile curves, bypassing the need for any curve optimization or manual authoring of normal and handles. Further, distinct scaled frames can be estimated for each side of the profile curves so that the surface deformation is localized per curve side.

As a result, curvenets significantly reduce the number of control points to be weighted or sculpted within the rig, while still producing a broad range of deformations. In an embodiment, curvenet deformation over the character surface can be done using suitable surface modeling and editing techniques based on 3D curves. While existing methods assume that the control curves are attached to mesh edges, thus limiting the deformation setup to a specific mesh resolution, one or more techniques disclosed herein provide for an improved deformation technique that produces detail-preserving character articulations driven by the rigged curvenet detached from the edges of the underlying surface mesh.

To propagate the deformation from both sides of the profile curves, a new mesh cutting technique can be used that conforms the character surface to the curvenet by splitting the mesh polygons crossed by the profile curves into multiple sub-polygons, possibly with cracks. Existing techniques for polygonal discretization can be extended to construct cut-aware discrete differential operators over the resulting cut-mesh. Finally, in an embodiment a shape optimization can be formulated to be adapted to the cut-mesh that computes the deformation of the character surface by interpolating the distortion and the pose of the rigged curvenet over the input mesh vertices. One or more of these techniques are described in the paper "Character Articulation through Profile Curves," by Fernando De Goes, William Sheffler, and Kurt Fleischer (the "De Goes paper") submitted herewith. The De Goes paper is hereby incorporated by reference.

FIG. 1 is a block diagram illustrating character articulation through profile curves, according to one embodiment. In an embodiment, a user (e.g., an artist) uses animation controllers 110 and a rig 120 to generate a curvenet 130. For example, a curvenet can be a collection of 3D curves that can intersect each other. The user can create these curves to represent characteristic profiles of a surface mesh the artist wishes to articulate. In order to support flexible designs, curvenets can be free of any topological restriction, including curves with open endpoints, intersections of arbitrary valence, and multiple connected components. Moreover, the individual curves are not required to be aligned to mesh edges or embedded onto the underlying surface. As a result, curvenets are agnostic to the mesh connectivity and the surface topology.

In an embodiment, curvenets are constructed using a modeling interface based on splines (e.g., cubic Bezier splines) inside the rig 120. For example, the system can start with the surface mesh the user wants to deform in a neutral pose. The user can then insert control points at arbitrary locations on the surface and generate curves resembling surface profiles (e.g., using a click-and-drag user interface or any other suitable user interface). Individual profile curves lie near the surface mesh but are not explicitly attached to the mesh connectivity. A cubic Bézier spline can be created by allocating two interior control points forming tangent handles and initialize them perpendicular to the surface normals. Endpoints are allowed to be shared by multiple splines. Thus, each cubic Bezier spline can be encoded as a tuple of four indices mapping to a pool of control points with their respective 3D positions. A suitable user interface can also allow the user to perform other operations, such as allowing the user to split and merge splines, weld and break control points, project endpoints to the surface mesh, and flatten tangents. These are merely examples, and any suitable techniques can be used.

In an embodiment, the animation controllers 110 and rig 120 can be use suitable existing techniques. For example, a user can articulate the curvenet 130 by simply posing the curve control points based on preexisting rigging techniques such as skinning and sculpting. In an embodiment, since the curvenet 130 has fewer points than a typical surface mesh, the resulting rig 120 is more compact and simpler to setup, while keeping the same articulation controllers and authoring workflows. The curvenet 130 can be further exploited, in an embodiment, as a direct surface manipulator, comparable to curve handles used by existing modeling and editing methods, thus enhancing the rig 120 with surface based shaping controllers.

In an embodiment, a profile mover 140 uses the curvenet 130 to generate a pose 150. For example, the profile mover 140 can use the techniques discussed below in relation to FIGS. 3-6 to compute articulated character poses by optimizing mesh deformation that reconstructs surface details while interpolating profile curves (e.g., the curvenet 130). This can include generating a surface deformation, at runtime, for the pose 150 using the curvenet 130. The pose 150 can be a computer animation model in a desired pose (e.g., desired by the user) for display using a suitable user interface.

Figure 2:
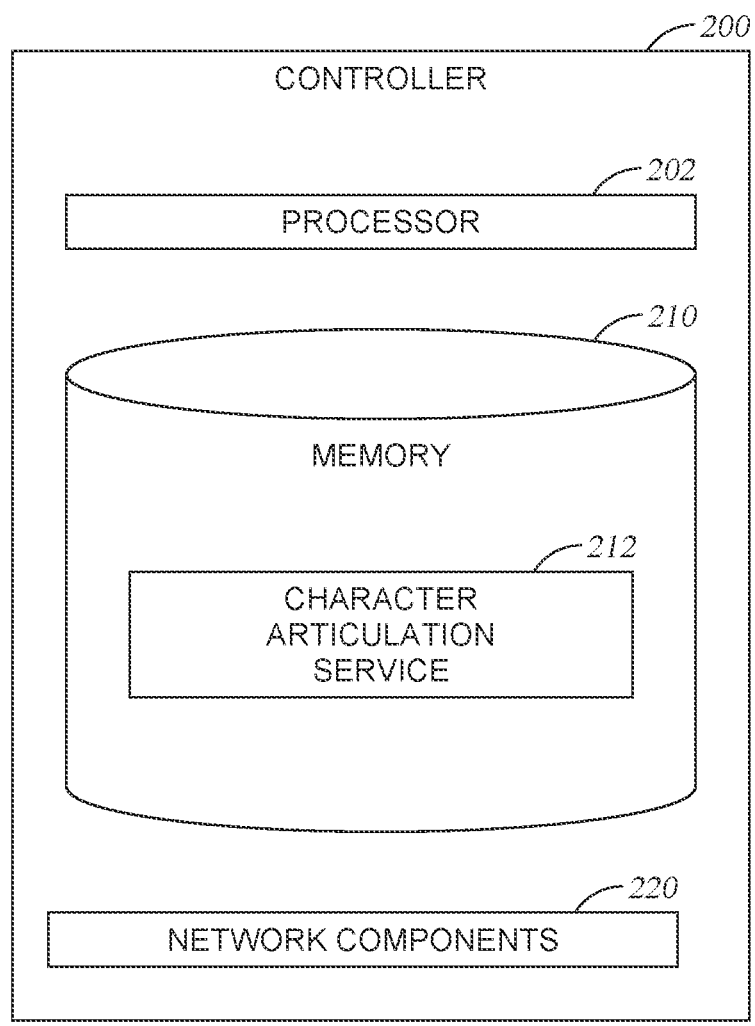
FIG. 2 illustrates a controller for character articulation through profile curves, according to one embodiment.

FIG. 2 illustrates a controller 200 for character articulation through profile curves, according to one embodiment. The controller 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 200 to interface with a suitable communication network (e.g., a communication network interconnecting various components illustrated in FIG. 1, or interconnecting the components of FIG. 1 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the character articulation service 212 facilitates character articulation through profile curves. This is discussed further below with regard to FIGS. 3-7.

While the controller 200 is illustrated as a single entity, in an embodiment, the various components can be implemented using any suitable combination of physical compute systems, cloud compute nodes and storage locations, or any other suitable implementation. For example, the controller 200 could be implemented using a server or cluster of servers. As another example, the controller 200 can be implemented using a combination of compute nodes and storage locations in a suitable cloud environment. For example, one or more of the components of the controller 200 can be implemented using a public cloud, a private cloud, a hybrid cloud, or any other suitable implementation. Further, the controller 200 may include one or more computing platforms, such as computer servers for example, which may be co-located, or may form an interactively linked but distributed system, such as a cloud-based system.

Further, although FIG. 2 depicts the character articulation service 212 as being located in the memory 210 that representation is also merely provided as an illustration for clarity. More generally, the controller 200 may include one or more computing platforms, such as computer servers for example, which may be co-located, or may form an interactively linked but distributed system, such as a cloud-based system. As a result, the processor 202 and memory 210 may correspond to distributed processor and memory resources within the components illustrated in FIG. 1. Thus, it is to be understood that the character articulation service 212 may be stored remotely within distributed memory resources.

Figure 3:
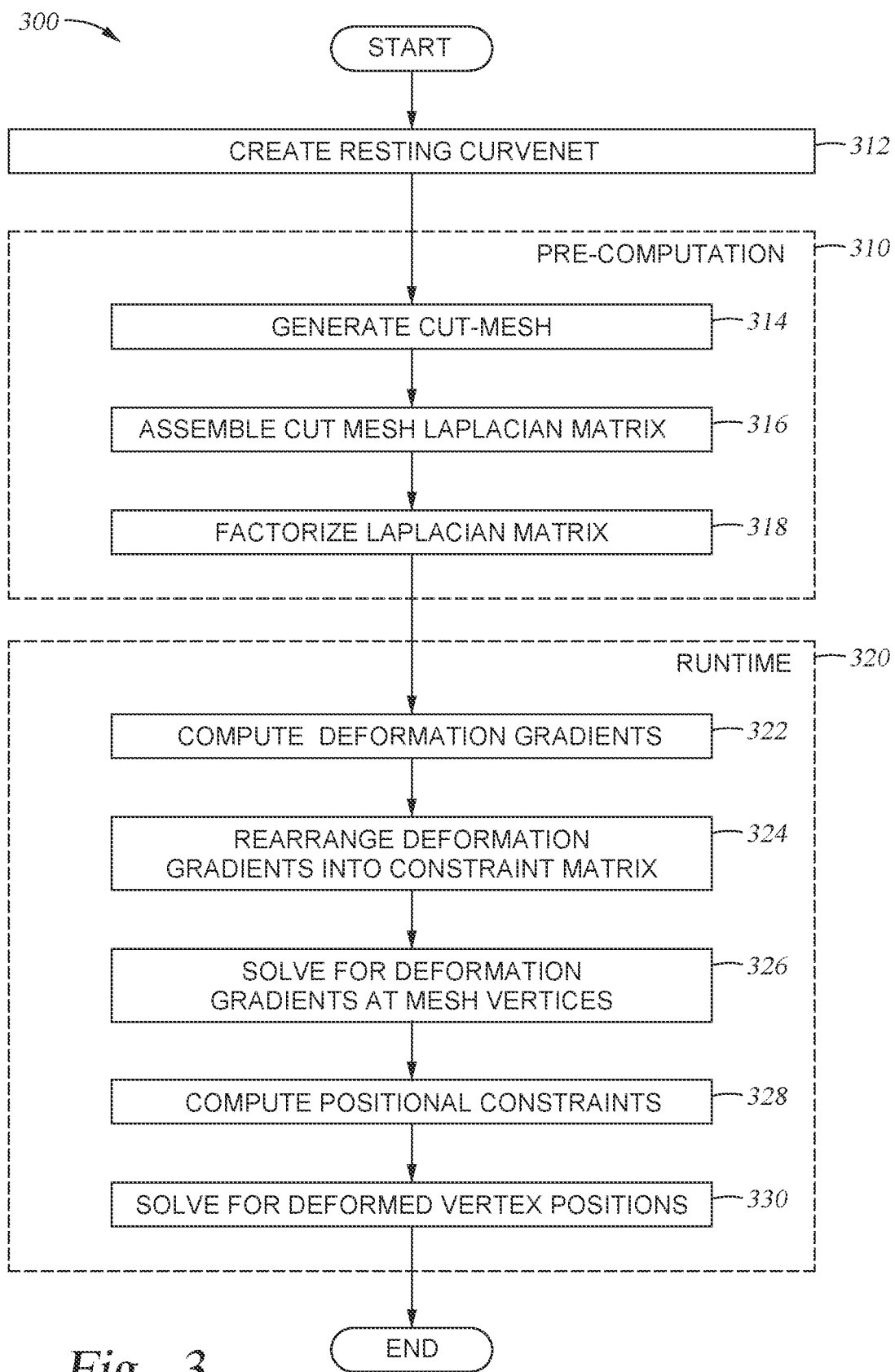
FIG. 3 is a flowchart illustrating character articulation through profile curves, according to one embodiment.

FIG. 3 is a flowchart 300 illustrating character articulation through profile curves, according to one embodiment. In an embodiment, a character articulation service (e.g., the character articulation service 212 illustrated in FIG. 2) performs a pre-computation 310. This pre-computation 310 can be performed in a neutral pose that combines a surface mesh with a sampled curvenet, as discussed in relation to blocks 314, 316, and 318 below, followed by runtime tasks 320 that produce the deformed surface based on the rigged curvenet (e.g., as discussed in relation to blocks 322, 324, 326, and 328, below). In an embodiment, the character articulation service completes the pre-computation 310 once (e.g., prior to character articulation) and caches the result (e.g., in a suitable electronic repository).

At block 312 a user (e.g., an artist), or any other suitable entity, creates a resting curvenet. For example, as discussed above in relation to the curvenet 130 illustrated in FIG. 1, a curvenet can be a collection of 3D curves that intersect each other. The user can construct the resting curvenet using a modeling interface (e.g., a suitable user interface) based on splines (e.g., cubic Bézier splines) inside a rigging package.

At block 314, the character articulation service generates a cut-mesh. In an embodiment, the character articulation service first generates evenly spaced samples that convert parametric curves (e.g., the cubic Bézier splines discussed above in relation to block 312) into polylines. The character articulation service then pre-computes a binding of the user created resting curvenet onto a surface mesh representing the character model in a neutral pose. A Cartesian cut-cell technique can be adapted to curved surfaces and used to cut the input mesh (e.g., a polygonal mesh) by tracing curvenet segments. This allows the character articulation service to capture different values estimated from each side of the curvenet segments, and the resulting cut-mesh retains the input mesh vertices as well as the curvenet samples, while splitting the mesh faces into smaller polygons, which can be non-planar, non-convex, and even include cracks. Generating the cut-mesh is discussed further, below, with regard to FIGS. 4A-B.

At block 316, the character articulation service assembles a cut-mesh Laplacian matrix. In an embodiment, the cut-mesh generated at block 314, above, provides a discrete representation of the input surface that conforms to the curvenet. The character articulation service can leverage this conforming mesh as a computational domain in which the curvenet deformation is interpolated over the vertices of the surface mesh. For example, a numerical discretization can be tailored to the cut-mesh to handle polygons with cracks, thus enabling smooth interpolations with localized discontinuities. The character articulation service can, as part of discretizing, assemble several matrices. This can include a Laplacian matrix L, a matrix C that maps sample values to adjacent half-edges, and a matrix V that copies values from cut-vertices to adjacent half-edges. These are merely examples, and any suitable number or type of matrices can be used. Discretizing the cut-mesh is discussed further, below, with regard to FIG. 5.

At block 318, the character articulation service factorizes the Laplacian matrix. As discussed further below in relation to FIG. 5, in an embodiment the character articulation service generates a Laplacian matrix $V^T L_h V$ that defines a modified Laplacian operator restricted to the vertices of the input surface mesh that incorporates the contributions of the sub-polygons generated by the mesh cutting with the sampled curvenet, while retaining a one-ring sparsity pattern similar to the original polygonal mesh. In an embodiment, this Laplacian matrix is assembled only once in the neutral pose, and so the character articulation service can pre-compute a sparse factorization of the Laplacian matrix. The factorization allows for the blocks of the runtime 320 to run significantly more computationally efficiently, compared to using a non-factorized matrix.

As discussed above, in an embodiment the character articulation service performs the techniques of blocks 314, 316, and 318 as part of a pre-computation 310 (e.g., prior to character articulation). In an embodiment the character articulation service completes the pre-computation 310 once and caches the result (e.g., for using during the runtime 320). The character articulation service then transitions and performs the techniques of blocks 322, 324, 326, and 328 as part of runtime 320 (e.g., during runtime for character articulation).

At block 322, the character articulation service computes curvenet deformation gradients. This is discussed further, below, with regard to FIG. 6. In an embodiment, the character articulation service can approximate each curve in the curvenet (e.g., each Bezier spline) with a fixed number of evenly spaced samples per spline. These samples can, for example, define a one-to-one mapping between segments of different curvenet poses. In an embodiment, the character articulation service can measure the distortion of a deformed curvenet relative to an undeformed configuration by evaluating the deformation gradient at each segment. The character articulation service can compute the deformation gradient using deformation gradient matrices (e.g., a deformation gradient matrix for each side of the curve).

At block 324, the character articulation service rearranges deformation gradients into a constraint matrix. In an embodiment, the character articulation service optimizes the curvenet deformation (e.g., computed at block 322 above) using a two-step approach. First, given the undeformed and deformed configurations of the sampled curvenet, the character articulation service interpolates the deformation gradients from the curvenet segments to the mesh vertices. Second, the character articulation service can then compute the vertex positions that best match the interpolated deformation gradients while preserving surface details and reproducing the target curvenet samples. This is discussed further, below, with regard to blocks 326-330.

In an embodiment, the character articulation service begins the first optimization step by using deformation gradient matrices (e.g., estimated from each side of every curvenet segment as discussed above in relation to block 322). The character articulation service remaps these matrices from segments to their incident samples. For a sample inside a curve, the character articulation service sets the left and right matrices by averaging the values from the previous and next segments along the curve. When the sample is a curve endpoint, the character articulation service makes a copy of the sample for every incident segment and assigns each copy to the values from the left and the right side of the corresponding segment. With these sample based deformation gradients, the character articulation service assembles the curvenet constraints as a matrix $f_c$ of size $n_c \times 9$ that flattens the deformation gradient matrices into row-vectors, wherein $n_c$ is the size of a vector $\phi_c$ that includes the values of the curvenet samples estimated from each side of every curvenet segment. This is discussed further, below, with regard to FIG. 5. In an embodiment, $n_c$ is twice the sum of the number of samples per curve At block 326, the character articulation service solves for deformation gradients at mesh vertices. In an embodiment, the character articulation service computes a matrix $f_v$ with the flattened deformation gradients at the mesh vertices by solving the expression:

$$\min_{f_v} E_D(Vf_v + Cf_C).$$

In an embodiment, this produces a harmonic interpolation over the cut-mesh for each column in $f_v$ with discontinuities at the curvenet samples prescribed by $f_c$. After combining the interpolated and constrained matrices $f_v$ and $f_c$, the character articulation service obtains the deformation gradient for the corner of every cut-face in the cut-mesh. The character articulation service then averages the corner values within each cut-face f and unfolds the resulting row-vector back into a 3×3 matrix denoted by $F_f$.

At block 328, the character articulation service computes positional constraints. For example, the character articulation service can compute a matrix $y_h$ with deformed cut-face polygons. In an embodiment, the deformation gradient $F_f$ per cut-face f indicates how the rest configuration of the simple polygon associated with f should be rotated and stretched. Since every halfedge is incident to a single cut-face, the character articulation service can gather the deformed polygons from every cut-face f into a matrix $y_h$ of size $n_h \times 3$, where $n_h$ represents the number of half-edges in the cut mesh.

As another example, the character articulation service can compute a matrix $x_C$ with displaced curvenet samples. In an embodiment, the second optimization step seeks new vertex positions that approximate the transformed cut-face polygons given by $y_h$, while enforcing the sample locations constrained by the posed curvenet. In an embodiment, the character articulation service accounts for the residual vector defined between each rest sample point and its projected point so that the deformed surface mesh preserves the offset relative to the deformed curvenet.

For example, the character articulation service can consider the copy of each curvenet sample with a target position $q_i$ and its corresponding deformation gradient matrix $F_i$ (e.g., indicated by the i-th unfolded row from the constraint matrix $f_c$). The character articulation service can then estimate the target projected position of the curvenet sample. Note that the left and right copies of each curvenet sample may receive different projection offsets based on the deformation gradient matrix from each side of the curvenet segments.

At block 330, the character articulation service solves for deformed vertex positions. In an embodiment, the character articulation service can rearrange the adjusted sample points from $x_C$ into the rows of a matrix $x_C$ of size $n_c \times 3$ representing the curvenet positional constraints. The character articulation service can then compute the matrix of positions for the mesh vertices using the expression:

$$\min_{x_v} E_D(Vx_v + CX_c - y_h)$$

In an embodiment, unconstrained convex optimizations (e.g., corresponding to the expression above) from these optimization techniques can be minimized by solving a sequence of linear systems.

Figure 4A:
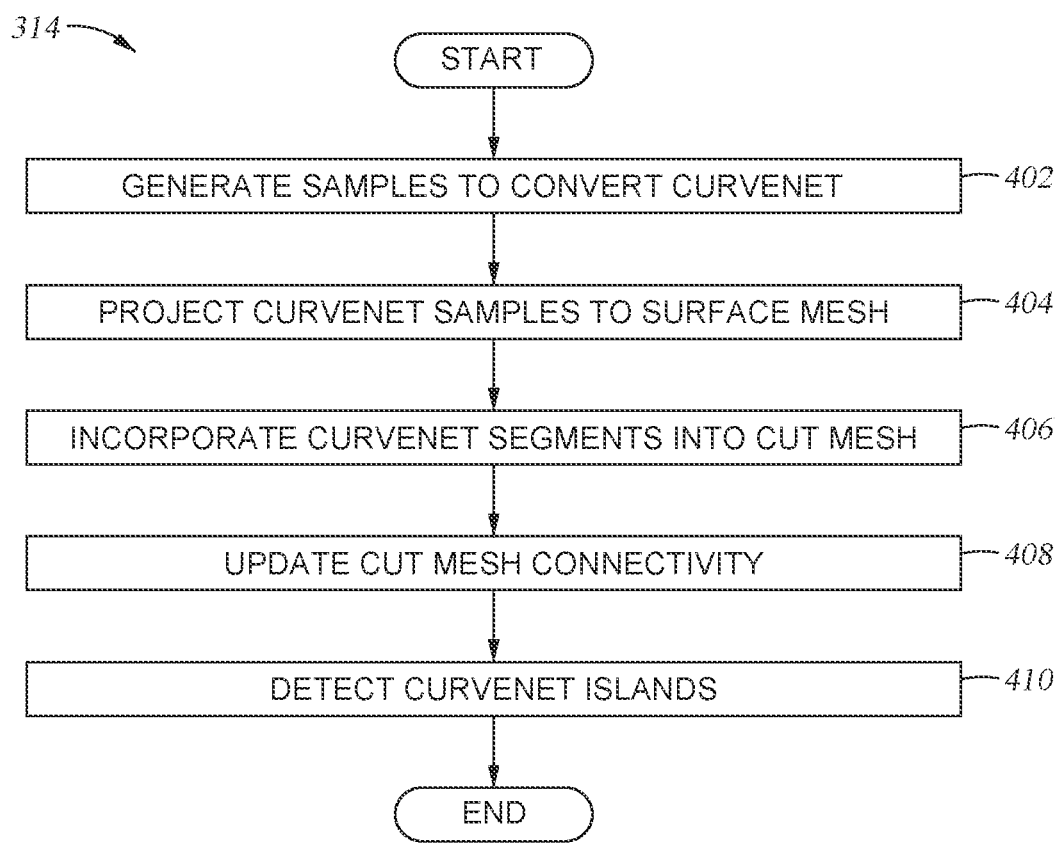
FIG. 4A is a flowchart illustrating generating a cut-mesh for character articulation through profile curves, according to one embodiment.

FIG. 4A is a flowchart illustrating generating a cut-mesh for character articulation through profile curves, according to one embodiment. In an embodiment, FIG. 4A corresponds with block 314 illustrated in FIG. 3. At block 402 a character articulation service (e.g., the character articulation service 212 illustrated in FIG. 2) generates evenly spaced samples to convert the curvenet into polylines. As discussed above, in an embodiment, the character articulation service precomputes a binding of a piecewise-linear curvenet onto the surface mesh representing the character model in a neutral pose. In order to capture the different values estimated from each side of the curvenet segments, a Cartesian cut-cell method can be adapted to curved surfaces, and can cut the input mesh (e.g., a polygonal mesh) by tracing curvenet segments. In an embodiment, the resulting cut-mesh retains the input mesh vertices as well as the curvenet samples, while splitting the mesh faces into smaller polygons. The smaller polygons can be non-planar, non-convex, and include cracks.

In an embodiment, the character articulation service implements the cut-mesh using a customized halfedge data structure that annotates halfedges with their corresponding oriented curvenet segments. This defines a mapping from the cut-mesh to the sampled curvenet. In an embodiment, the character articulation service can also include a bitmask to encode whether each cut-vertex refers to a mesh vertex, a curvenet sample, or an intersection between a curvenet segment and a mesh edge. To indicate cracks cutting a polygon, the character articulation service can permit cut-edges to branch out of the cut-face boundary with their respective pairs of opposite halfedges both pointing to the same cut-face.

At block 404, the character articulation service projects curvenet samples to the surface mesh. In an embodiment, the character articulation service initializes the cut-mesh with a copy of the input polygonal mesh, and then project the neutral position for each curvenet sample to the closest point on the surface mesh. Based on the mesh element hit by the projection, the character articulation service categorizes each sample as a vertex, edge, or face-sample.

In an embodiment, the character articulation service detects whether a projected sample is at a vertex or within an edge using a numerical tolerance (e.g., a tolerance of 0.001% of the diagonal length of the surface bounding box). The character articulation service further employs vertex-samples to tag the bitmask of their coincident cut-vertices. In an embodiment, the character articulation service subdivides cut-edges containing edge-samples (e.g., every cut-edge containing edge-samples) by inserting new cut-vertices at their respective projected locations. The character articulation service further allocates face-samples as isolated cut-vertices, and later connects the face-samples by curvenet segments.

At block 406, the character articulation service incorporate curvenet segments into the cut mesh. In an embodiment, the character articulation service reuses the sample-to-mesh categories and enumerates all possible sample combinations per segment, in order to incorporate the curvenet segments into the cut-mesh. This is discussed further, below, with regard to FIG. 4B. For example, a segment may correspond to an existing cut-edge that connects vertex and/or edge-samples. This is illustrated in column 460 in FIG. 4B.

As another example, the character articulation service can create new cut-edges that pass across input polygons. The character articulation service can do this by inserting new cut-edges with halfedge pairs pointing to the same cut-face, and subsequently update the cut-mesh by splitting the affected cut-faces. If the segment has samples at the boundary or contained by the same mesh face, the character articulation service place the new cut-edge inside the corresponding cut-face. This is illustrated in columns 470 and 480 in FIG. 4B.

When the segment samples do not share a mesh face, the character articulation service trace the straightest path between the projected sample points over the surface mesh. As a result, the segment is rasterized into a chain of new cut-edges with cut-vertices added at the intersections between the segment path and the input mesh edges. This is illustrated in column 490 in FIG. 4B.

At block 408, the character articulation service updates the cut-mesh connectivity. In an embodiment, the character articulation service update the cut-mesh connectivity in order to identify split cut-faces produced by the curvenet segments. The character articulation service can do this by computing a tangent space for each cut-vertex, projecting its incident halfedges onto the tangent space, and then sorting the projected halfedges counter-clockwise.

To compute the tangent spaces, the character articulation service can take advantage of the fact that the cut-mesh is constructed on top of the input polygonal mesh. The character articulation service can assign the tangent space for any cut-vertex by referring to the corresponding point on the surface mesh. More concretely, when a cut-vertex is inside a mesh face, the tangent space is set to the plane orthogonal to the normal of the underlying polygon. If the cut-vertex lies inside a mesh edge, the character articulation service defines the tangent space by unfolding the pair of faces sharing the mesh edge to a common plane. Alternatively, if the cut-vertex is at a mesh vertex, the character articulation service flattens the one-ring of faces incident to the mesh vertex. With sorted halfedges at the cut-vertices, the character articulation service can circulate from one halfedge to the next and reset the cut-mesh with new cut-faces for every loop of halfedges.

At block 410, the character articulation service detects curvenet islands. In an embodiment, a special case sometimes arises in which the curvenet has clusters of segments held entirely inside individual faces of the input mesh. These clusters indicate holes that cut the interior of the mesh polygons. Since the character articulation service has inserted every segment into the cut-mesh, the character articulation service can detect these curvenet islands by computing connected components of the cut-mesh formed exclusively by face-samples attached to the same mesh face. Further, in an embodiment, the character articulation service can remove every element of the cut-mesh incident to these isolated components (e.g., because they represent a level of detail finer than the resolution of the surface mesh).

Figure 4B:
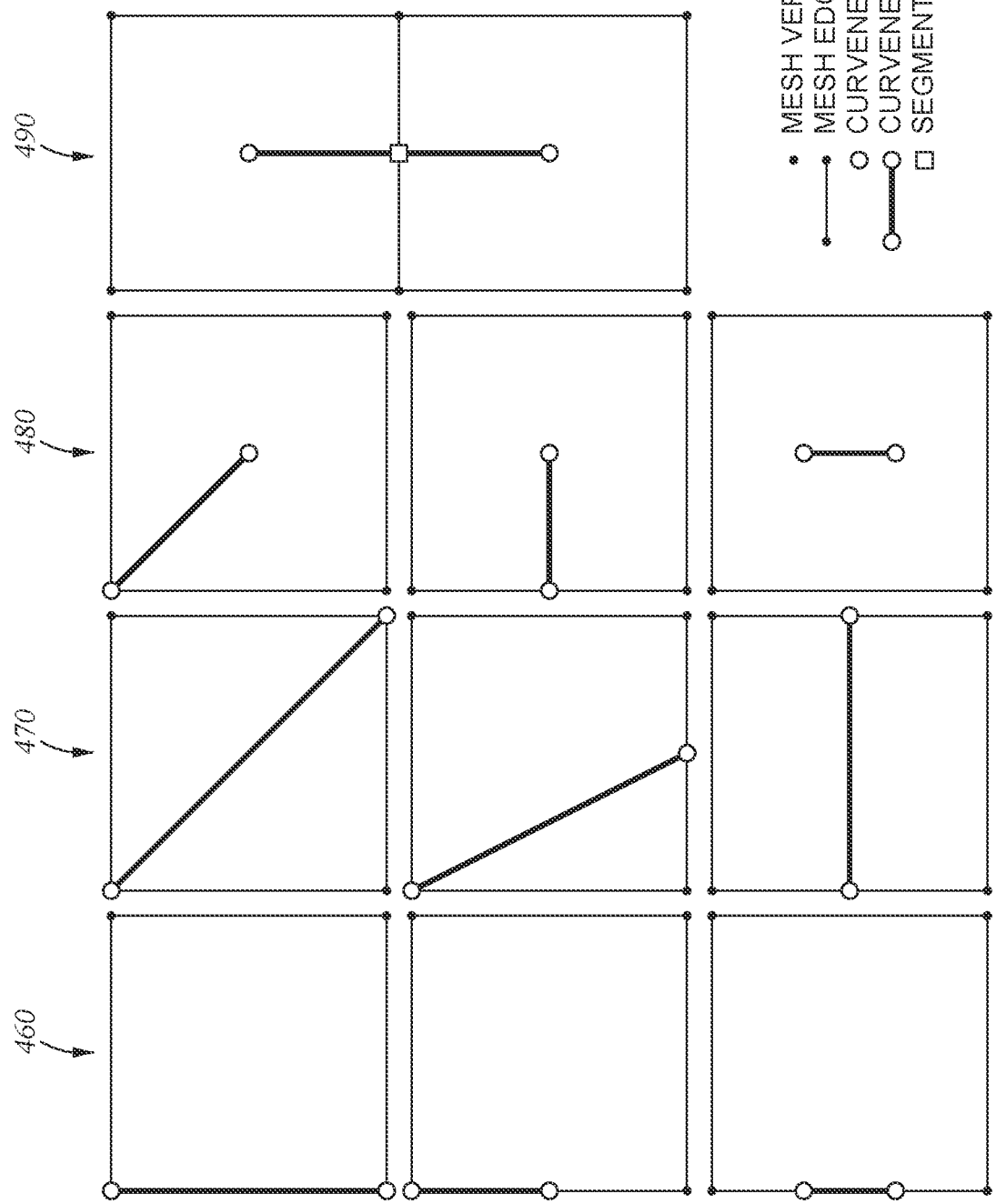
FIG. 4B further illustrates generating a cut-mesh for character articulation through profile curves, according to one embodiment.

FIG. 4B further illustrates generating a cut-mesh for character articulation through profile curves, according to one embodiment. In an embodiment, to cut a mesh polygon by a curvenet segment, one can enumerate different arrangements between the curvenet samples and the mesh elements. As discussed above in relation to FIG. 4A, the column 460 shows a segment with both samples incident to the same mesh edge, which subdivides the cut-edge for every sample located inside the edge. The column 470 corresponds to a curvenet segment that divides the mesh polygon into smaller cut-faces. The column 480 illustrates cracks in the mesh polygon formed by the curvenet segment, which can be completely inside the cut-face or slicing its boundary. The column 490 illustrates an example of a segment traced through multiple mesh elements that inserts new cut-vertices at the segment-edge intersections.

Figure 5:
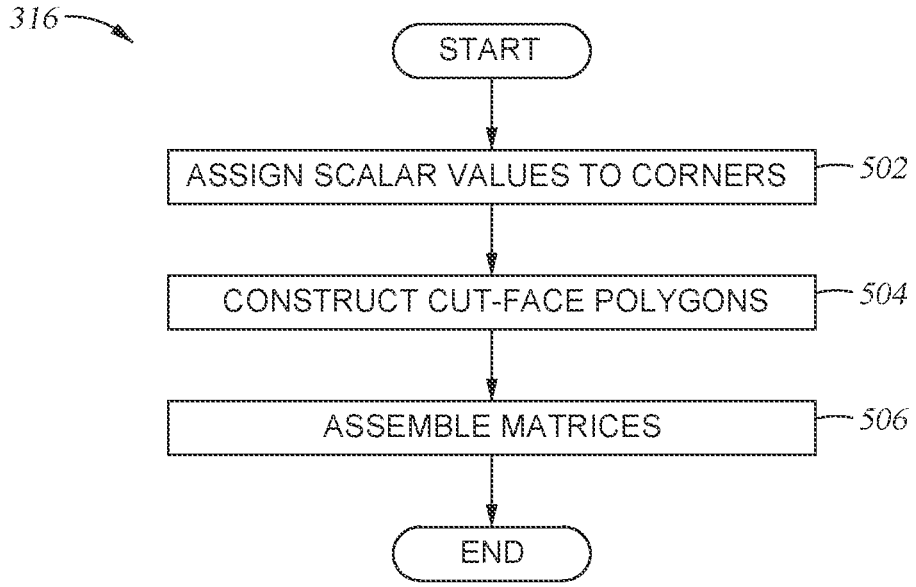
FIG. 5 is a flowchart illustrating assembling a cut-mesh Laplacian matrix, according to one embodiment.

FIG. 5 is a flowchart illustrating assembling a cut-mesh Laplacian matrix, according to one embodiment. In an embodiment, FIG. 5 corresponds with block 316 illustrated in FIG. 3. At block 502 a character articulation service (e.g., the character articulation service 212 illustrated in FIG. 2) assigns scalar values to corners. In an embodiment, the character articulation service starts by discretizing the space of functions defined over the cut-mesh. In order to convey discontinuities, the character articulation service represents discrete functions by assigning a scalar value for each corner of a cut-face (e.g., similar to encoding of uv-coordinates on surface meshes). Because face-corners can be indexed by halfedges, the character articulation service assembles the discrete version of a scalar function by a vector of size equal to the number of halfedges in the cut-mesh. These values can be interpolated linearly along the halfedges forming each cut-face. The discontinuities are then indicated by any cut-vertex that reads different values from its incident halfedges.

At block 504, the character articulation service constructs cut-face polygons. In an embodiment, the character articulation service evaluates the smoothness of a discrete function using polygonal discretization, which assumes that the mesh polygons are simple. At first sight, the cut-mesh seems to fail this requirement because the cutedges can depict cracks inside the mesh polygons. To accommodate polygons with cracks, the character articulation service constructs the polygon of a cut-face using the ordered list of face-corners defined by the loop of halfedges outlining the cutface. By doing so, crack edges are split into pairs of halfedges, cut-vertices are duplicated and, consequently, the cut-face is represented by a simple polygon of arbitrary shape.

At block 506, the character articulation service assembles matrices. Given a cut-face f formed by a loop of $n_f$ halfedges, the character articulation service assembles a matrix of size $n_f \times 3$. The matrix contains the 3D points that define the simple polygon associated with f ordered counter-clockwise, stacked row-wise, and in a neutral pose. In an embodiment, this matrix can be used to compute a polygonal Laplacian matrix $L_f$ of size $n_f \times n_f$. This is discussed further in Appendix A to the De Goes paper, which as noted above is incorporated herein by reference.

In an embodiment, the character articulation service defines the cut-mesh Laplacian as the matrix $L_h$ of size $n_h \times n_h$ that gathers the contribution of every cut-face Laplacian matrix. Finally, the character articulation service can measure the smoothness of a discrete function on over the cut-mesh via the Dirichlet energy ($E_D$) equation below:

$$E_D(\varphi_h) = \varphi_h{}' L_h \varphi_h$$

In an embodiment, the character articulation service restricts the solution space of discrete functions so that discontinuities are imposed as constraints by the curvenet, while mesh vertices are assigned to smooth values shared by their incident halfedges. This allows the character articulation service to compute an interpolation from the curvenet to the input mesh. Further, the character articulation service can organize the cut-vertices into two groups based on their bitmasks. The first group defines the interpolation unknowns represented by every cut-vertex coincident to a mesh vertex. In an embodiment, the character articulation service arranges these unknowns as a vector of size $n_v$ and introduces a of size $n_h \times n_v$ that copies values from these cut-vertices to their adjacent halfedges.

Conversely, the second group includes every cut-vertex corresponding to a curvenet sample or created by the intersection of a curvenet segment and a mesh edge. Note that some of the halfedges emanating from these cut-vertices are annotated by curvenet segments and, therefore, indicate constraints to be set onto the cut-mesh. A vector with the values of the curvenet samples estimated from each side of every curvenet segment can be represented by $\phi_c$. In total, the size $n_c$ of the vector $\phi_c$ is twice the sum of the number of samples per curve. The character articulation service further assembles a matrix C of size $n_h \times n_c$ that maps these sample values to their adjacent halfedges. In the case of a cut-vertex incident to both a mesh vertex and the curvenet, the character articulation service gives precedence to the curvenet constraint.

Figure 6:
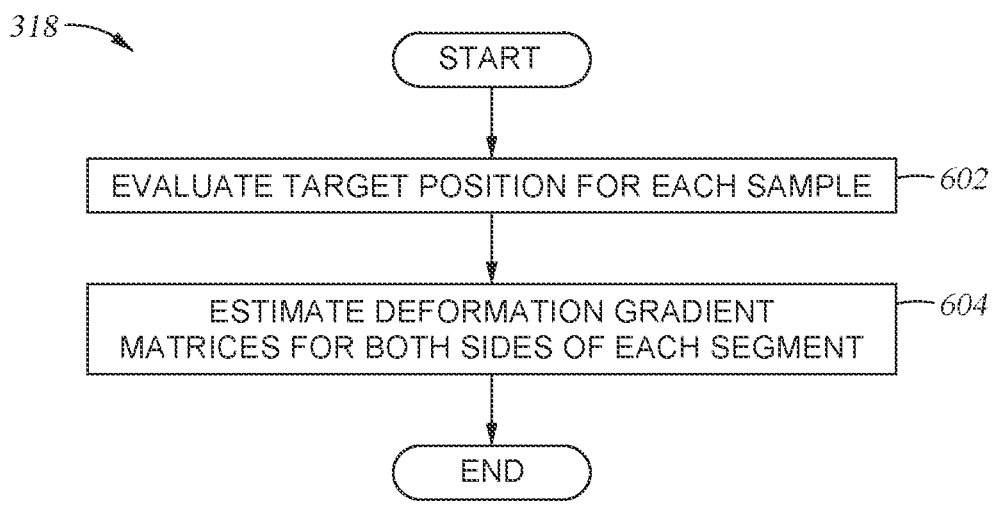
FIG. 6 is a flowchart illustrating computing curvenet deformation gradients for character articulation through profile curves, according to one embodiment.

FIG. 6 is a flowchart illustrating computing curvenet deformation gradients for character articulation through profile curves, according to one embodiment. In an embodiment, FIG. 6 corresponds with block 322 illustrated in FIG. 3. At block 602 a character articulation service (e.g., the character articulation service 212 illustrated in FIG. 2) evaluates a target position for each sample. In an embodiment, the character articulation service can approximate the curvenet shape by converting its cubic Bézier splines into polylines with evenly spaced sample points.

For example, each spline can be first refined uniformly in parametric space and then resampled evenly based on arc-length. The number of samples inside each spline is set to a user-specified value (e.g., five by default) multiplied by the ratio between the length of the polyline connecting the spline's control points and the mean edge length of the underlying surface mesh, both calculated in a neutral pose. In an embodiment, this provides a piecewise-linear representation of the curvenet with resolution proportional to the size of surface mesh elements and adaptive to the length of the undeformed splines. A segment can be referred to as a pair of consecutive sample points within a curve of the discretized curvenet.

At block 604, the character articulation service estimates deformation gradient matrices for both sides of each segment. In an embodiment, because the character articulation service approximates each curve with a fixed number of evenly spaced samples per spline, these samples define an one-to-one mapping between the segments of different curvenet poses. With this correspondence, the character articulation service can measure the distortion of a deformed curvenet relative to an undeformed configuration by evaluating the deformation gradient at each segment.

In an embodiment, the deformation gradient is a matrix $F_i$ that quantifies the amount of rotation and stretching deforming a rest segment to its respective posed segment. For curves incident to intersections, the character articulation service computes the deformation gradient for each side of a segment $s_i$ as the matrix $F_i = (B_i S_i)('B_i 'S_i)^{-1}$ that transforms the rest scaled frame $'B_i 'S_i$ to the posed scaled frame $B_i S_i$. We can further expand the deformation gradient matrix using axis vectors and scales, yielding a deformation gradient that includes a tangential rotation, a normal twist, and non-uniform scaling, all deduced directly from the curvenet representation. In an embodiment, the character articulation service can further include one or more optional features, including shearing and configuring a distance between a curvenet and the surface mesh. For example, shearing could be an optional feature configured by a user. In this example, a user could choose to use a non-orthogonal matrix, as opposed to a matrix constructed with orthonormal vectors. The curve tangents and normals are the same in both scenarios, but the third vector (e.g., a binormal vector) would differ. In the non-orthogonal matrix scenario a user can choose to shear the binormal vector relative to the tangent and normal vectors. In an embodiment, using shearing improves the volume preservation but adds shearing distortion to the mesh faces. As another example, a user could configure a desired distance between the curvenet and the underlying surface mesh. In an embodiment, curvenet samples at the neutral pose may have some gap to the surface. The user can whether if this gap should be preserved as the character is deformed, or if the mesh should snap to the deformed curvenet. This control can be set as a weight per Bézier knot.

Further, the matrices for both segment sides share the same tangential transformation but they can have different twisting and non-tangential stretching amounts. In the case of isolated curves, either closed or with both ends at anchors, there is no curvenet structure that complements the tangent and the length of the curve segments. The character articulation service can thus compute the deformation gradient for a segment $s_i$ in these simplistic curves using the smallest rotation from the rest tangent $'t_i$ to the posed tangent $t_i$ multiplied by a uniform scaling (e.g., based on a length ratio).

In an embodiment, as discussed above, the same neutral pose can be used for projecting the curvenet onto the surface mesh and also to define the undeformed surface configuration. However, some rigging setups may benefit from hybrid approaches that layer the curvenet articulation with other surface deformations. In order to support more flexible rigs, the techniques discussed above can be modified to take into account different projection and rest poses of the input surface mesh. The projection pose can be indicated as the surface shape in which the curvenet is designed (e.g., a model T-pose). After constructing the curvenet, a character articulation service can employ the projection pose to resume pre-computing the cut-mesh and the Laplacian-based linear solver.

Conversely, the rest pose can represent the result of any surface deformation performed before the curvenet articulation. Since the curvenet and the cut-mesh are created in the projection pose both can be warped to the shape of the rest surface by reusing the binding of the curvenet samples onto the closest points of the surface mesh previously cached by our cutting routine. Given these warped poses, the character articulation service can evaluate the rest pose values for the scaled frames along the sampled curvenet as well as the undeformed cut-face polygons, which are then used by our surface optimization.

For example, a face rig made of patch and joint deformers can be combined with the body deformation controlled by curvenets. In this example, separate meshes could be include for various aspects of the rig, including separate meshes for the hair, brows, and eyeballs attached to the body surface. As another example, a mesh can be edited via curvenet after running a simulation (e.g., a cloth simulation). This rig configuration may be useful for incorporating shot-specific and view-dependent corrections by directly manipulating the simulated shapes instead of rerunning the offline simulation. Since the projection pose is persistent throughout the animation frames, the character articulation service can deform these simulated shapes efficiently by leveraging the pre-computed curvenet solver.

Further, in addition to hybrid rigs, one or more techniques discussed above can also be coupled with blend shapes that enhance the surface deformations with mesh-specific details finer than the curvenet resolution. For example, the character articulation service can superpose blend shapes as vertex offsets relative to the rest surface mesh, and then use vertex frames to reconstruct these displacements on top of the shape produced by the curvenet deformation. In an embodiment, blend shapes can be represented as separated from the surface rest pose so that vertex sculpts can be animated without recomputing the curvenet deformation. Alternatively, blend shapes can be included as part of the rest configuration (e.g., if preferred by the rigger). Further, sculpts can be added only when high frequency mesh details are needed, in contrast to typical pose-space deformation methods that employ blend shapes to resolve deformation artifacts.

In addition, one or more of the techniques disclosed above can be applied to modeling. These techniques can be used to create a new shape for a surface. This is merely an example, and the described techniques can be used for any suitable application.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a plurality of curvenet segments relating to a computer animation model comprising a surface mesh, wherein the plurality of curvenet segments are detached from the surface mesh and agnostic to connectivity and topology of the surface mesh, and wherein receiving the plurality of curvenet segments comprises:
identifying a set of control points located on a surface of the surface mesh; and
receiving splines connecting the set of control points and generated based, in part, on profiles of the surface mesh;
generating a cut-mesh that splits one or more polygons of the surface mesh that are crossed by at least one of the plurality of curvenet segments into a set of sub-polygons of the surface mesh;
computing a deformation of the plurality of curvenet segments to the surface mesh using the cut-mesh; and
displaying the computer animation model in a pose based on the deformation.

2. The method of claim 1, wherein computing the deformation of the plurality of curvenet segments to the surface mesh further comprises:
estimating a respective deformation gradient matrix for each side of each of the plurality of curvenet segments.

3. The method of claim 2, wherein each respective deformation gradient matrix quantifies an amount of at least one of: (i) rotation or (ii) stretching relating to deforming a rest segment for the computer animation model to a corresponding posed segment in the pose.

4. The method of claim 1, wherein generating the cut-mesh comprises:
projecting a plurality of samples, relating to the plurality of curvenet segments, to the surface mesh;
incorporating the plurality of curvenet segments into the cut-mesh; and
updating the cut-mesh connectivity.

5. The method of claim 1, further comprising:
discretizing the generated cut mesh using a plurality of matrices.

6. The method of claim 5, wherein the plurality of matrices comprise a Laplacian matrix, the method further comprising:
factorizing the Laplacian matrix.

7. The method of claim 1, further comprising:
rearranging one or more deformation gradients into a constraint matrix;
solving for deformation gradients at vertices relating to the surface mesh;
computing a first matrix relating to deformed cut-face polygons and a second matrix relating to displaced curvenet samples; and
solving for deformed vertex positions.

8. The method of claim 1, wherein displaying the computer animation model in the pose is based on a hybrid rigging approach that includes both the plurality of curvenet segments and additional surface deformations.

9. The method of claim 1, wherein the displaying the computer animation model in the pose is further based on a plurality of blend shapes.

10. The method of claim 1,
wherein the plurality of curvenet segments relate to a plurality of Bézier splines created by a user,
wherein the cut-mesh is pre-computed, prior to a runtime, and stored in an electronic repository, and
wherein computing the deformation occurs during the runtime and comprises retrieving the cut-mesh from the electronic repository.

11. A non-transitory computer-readable medium containing computer program code that, when executed by operation of one or more computer processors, performs operations comprising:
receiving a plurality of curvenet segments relating to a computer animation model comprising a surface mesh, wherein the plurality of curvenet segments are detached from the surface mesh and agnostic to connectivity and topology of the surface mesh, and wherein receiving the plurality of curvenet segments comprises:
identifying a set of control points located on a surface of the surface mesh; and
receiving splines connecting the set of control points and generated based, in part, on profiles of the surface mesh;
generating a cut-mesh that splits one or more polygons of the surface mesh that are crossed by at least one of the plurality of curvenet segments into a set of sub-polygons of the surface mesh;
computing a deformation of the plurality of curvenet segments to the surface mesh using the cut-mesh; and
displaying the computer animation model in a pose based on the deformation.

12. The non-transitory computer-readable medium of claim 11, wherein computing the deformation of the plurality of curvenet segments to the surface mesh further comprises:
estimating a respective deformation gradient matrix for each side of each of the plurality of curvenet segments.

13. The non-transitory computer-readable medium of claim 12, wherein each respective deformation gradient matrix quantifies an amount of at least one of: (i) rotation or (ii) stretching relating to deforming a rest segment for the computer animation model to a corresponding posed segment in the pose.

14. The non-transitory computer-readable medium of claim 11, wherein generating the cut-mesh comprises:
projecting a plurality of samples, relating to the plurality of curvenet segments, to the surface mesh;
incorporating the plurality of curvenet segments into the cut-mesh; and
updating the cut-mesh connectivity.

15. The non-transitory computer-readable medium of claim 11, the operations further comprising:
discretizing the generated cut mesh using a plurality of matrices, the plurality of matrices comprising a Laplacian matrix; and
factorizing the Laplacian matrix.

16. A system, comprising:
a processor; and
a memory having instructions stored thereon which, when executed on the processor, performs operations comprising:
receiving a plurality of curvenet segments relating to a computer animation model comprising a surface mesh, wherein the plurality of curvenet segments are detached from the surface mesh and agnostic to connectivity and topology of the surface mesh, and wherein receiving the plurality of curvenet segments comprises:

identifying a set of control points located on a surface of the surface mesh; and receiving splines connecting the set of control points and generated based, in part, on profiles of the surface mesh;

generating a cut-mesh that splits one or more polygons of the surface mesh that are crossed by at least one of the plurality of curvenet segments into a set of sub-polygons of the surface mesh;

computing a deformation of the plurality of curvenet segments to the surface mesh using the cut-mesh; and displaying the computer animation model in a pose based on the deformation.

17. The system of claim 16, wherein computing the deformation of the plurality of curvenet segments to the surface mesh further comprises:

estimating a respective deformation gradient matrix for each side of each of the plurality of curvenet segments.

18. The system of claim 17, wherein each respective deformation gradient matrix quantifies an amount of at least one of: (i) rotation or (ii) stretching relating to deforming a rest segment for the computer animation model to a corresponding posed segment in the pose.

19. The system of claim 16, wherein generating the cut-mesh comprises:

projecting a plurality of samples, relating to the plurality of curvenet segments, to the surface mesh;

incorporating the plurality of curvenet segments into the cut-mesh; and updating the cut-mesh connectivity.

20. The system of claim 16, the operations further comprising:

discretizing the generated cut mesh using a plurality of matrices, the plurality of matrices comprising a Laplacian matrix; and factorizing the Laplacian matrix.

* * * * *